Oct. 21, 1958     A. C. LAIRD     2,857,453
SHIELDING TAPE FOR ELECTRIC POWER CABLES
Filed Oct. 20, 1955

INVENTOR
ANDREW C. LAIRD
BY
ATTORNEYS

2,857,453
SHIELDING TAPE FOR ELECTRIC POWER CABLES

Andrew C. Laird, Hastings-on-Hudson, N. Y., assignor to Anaconda Wire and Cable Company, a corporation of Delaware Application October 20, 1955, Serial No. 541,558

1 Claim. (Cl. 174—73)

The present invention relates to electrical apparatus, and more particularly to an improved article for use in combination with a power cable for providing a conductive shield about the cable, at joints, terminals and the like.

In the construction of heavy-duty electrical power lines it is common practice to employ power cables which are comprised of a current-carrying conductor, about which is wrapped a layer of insulating material. When the cables are in use, large electrostatic charges may develop on the outer surface of the insulating material and lead to non-uniform distribution of voltage stress through the insulation. To overcome this, it is common practice to provide a metallic electrostatic shield about the outer surface of the insulation so that as charges tend to develop on the insulation the same are quickly equalized about the entire periphery of the cable, and the shield is usually connected to ground at various points so that the charge may be drained off. This current-conductive shield is conventionally in the form of a thin strip or tape of metal which is wound helically about the outer surface of the cable.

In order to joint two lengths of power cable together, or to bring the cable into a pothead or other terminal connection, the metal shielding tape must be stripped back from the cable end so that a portion of the conductor may be bared, and so that joint or terminal insulation may be applied. It is important, however, that after the connection is made, and the joint or terminal insulation has been applied, the terminal portion of the cable or the joint again be provided with a proper shield. In the case of a joint, this is necessary so that a current path will be provided from one cable section to the other; and in the case of a terminal connection the shield is necessary since charges tend to develop more readily at the terminals of the cable than at other points.

In making a joint or terminal connection, the end portions of the cable sections are wrapped with layers of tape to build up a tapered splice or terminal body of insulating material, so that in this area the cable may be quite bulky and of non-cylindrical form. Therefore it is necessary to utilize shielding tape which is flexible in order that it may conform to the compound curves of the joint or connection, and which is sufficiently conductive to carry off the charges which may develop. In the past, such tapes have been formed of interwoven strands of cotton about which are wound very fine ribbons of copper or other conductive material. This is not entirely satisfactory, since the ribbons of conductive material are necessarily so small as to substantially limit the current-carrying capacity of the tape. Moreover, it is accepted practice to make a soldered connection between adjacent convolutions of the tape, and between the tape and the principal cable shield, so that a better current path is provided, and this presents a considerable problem when using the tape of the prior art, since the cotton fibers will tend to char, and the fine copper ribbons to burn through so that soldering is difficult and the connection often unsatisfactory.

To overcome the various objections discussed above, the present invention provides a shielding tape which is comprised of a plurality of strands of tinned copper wire which are interwoven to form a mesh-like tape. The strands of wire are small in diameter and flexible and are interwoven in such a manner that the tape may be expanded or compressed in a transverse direction. The arrangement is such that the tape, which is formed entirely of current-conducting material, may be wrapped helically around the splice or connection and readily soldered in the desired manner, to provide a shield which has as much or more conducting capacity than the primary cable shield, and which may be made to lay in intimate contact with the outer surface of the tapered layer of insulation at the joint or terminal despite the non-cylindrical form thereof.

For a better understanding of the invention, reference may be had to the accompanying drawings, in which.

Figure 3:
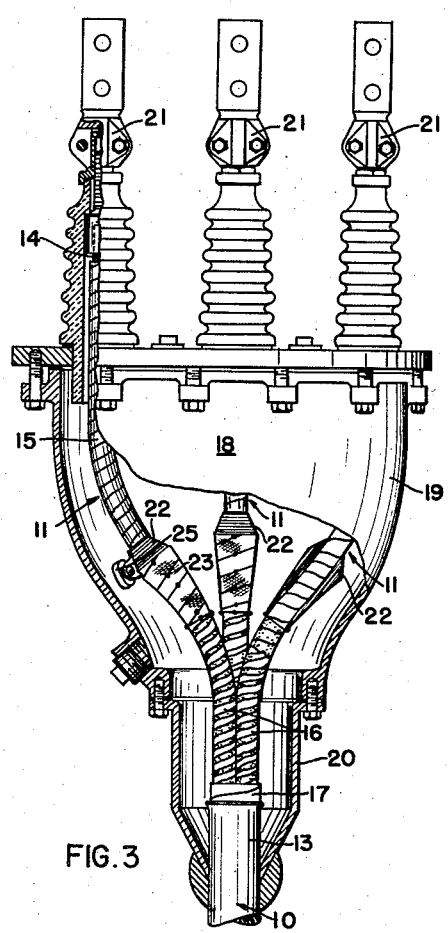
Fig. 3 is an elevation of a pothead terminal connection, with parts broken away.

Referring initially to Fig. 3, there is shown a conventional heavy-duty power cable 10 which includes three insulated conductors 11 which are cabled together and surrounded by a conducting binder 17 and a lead sheath 13. Each of the insulated conductors 11 comprises a metallic conductor 14, which generally will be stranded, a wrapped layer of insulating material 15, and a shield 16 which is formed of helically wrapped strips of copper tape, or of copper tape intercalated with semi-conducting paper tape impregnated with carbon-black. The binder 17, which is likewise formed of tapes of copper, or of copper intercalated with paper impregnated with carbon-black, is provided about the assembly of the three conductors 11. The shields 16 and 17 thus prevent the build-up of any charges on the outer surface of the insulations 15.

At the terminal points of the cable 10 it is common practice to employ a pothead 18, which is comprised of a large bell or housing 19 having a cable entrance fitting 20 at its lower end and having a plurality of insulated terminals 21 at its upper end. The sheathed cable 10 is brought into the pothead 18 through the entrance fitting 20, and within the bell 19 the sheath 13 and binder 17 are stripped back to expose the plurality of insulated conductors 11. The copper shields 16 about the cables 11 are also stripped back, leaving the insulation 15 exposed over a considerable length. The exterior end portion of each cable 11 is then stripped free of the insulation 15 so that the conductors 14 may be properly connected to the terminal connectors 21.

Near the point of convergence of the three cables 11, within the pothead 18, tapered layers 22 of terminal insulation are applied by wrapping insulating tape about the normal insulation 15 of the cables. Since heavy electrostatic charges tend to build up in these areas, the tapered insulation layers 22 are also wrapped with layers 23 of current-conductive shielding tapes which are connected to the copper shields 16 and also to a ground, which may be the bell 19 of the pothead.

Figure 1:
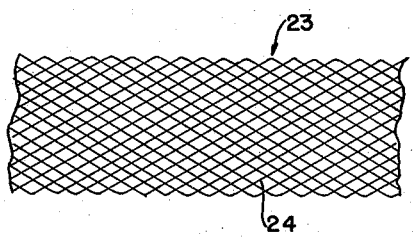
Fig. 1 is a plan view of a length of shielding tape formed in accordance with the teachings of the present invention.
Figure 2:
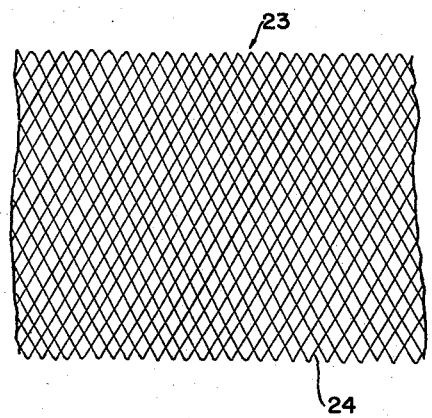
Fig. 2 is a plan view of the tape of Fig. 1 in an expanded condition.

Referring now to Figs. 1 and 2, the shielding tape of the present invention is comprised of a plurality of thin strands 24 of copper which extend generally longitudinally of the length of tape, but zig-zag from one side to the other thereof. The separate strands 24 are rather loosely interwoven with a simple under-over weave, in which, in the illustrated form, each strand is crossed over the tops of two cross strands, then under the next two cross strands, and so on. At the edge of the tape the strands are bent around and directed diagonally toward the opposite edge of the tape, so that the edges of the tape are defined by the bends in successive strands of wire.

As will be observed upon comparison of Figs. 1 and 2, the new tape, which is shown in its normal condition in Fig. 1, may be stretched to a substantial extent in a transverse direction, as indicated in Fig. 2. Thus, when the tape is wrapped about the compound contours of the tapered insulation layers 22, it will stretch or compress laterally so as to fit in tight conformity about the outer surface of the insulation. And since the entire body of the tape is formed of copper material, the edge portions of adjacent convolutions of the tape may be readily soldered together, with beads 25 of solder, for example, and the ends of the tape may be properly soldered to the ends of the copper shields 16 in the manner desired. In this respect, it will be noted that each strand 24 of the tape will be tinned, so that the tape may be soldered at any point.

Although it will be understood that the size of the strands employed, as well as the number thereof, is not a critical feature of the invention and may be varied to suit the requirements of various applications, it has been found that a tape formed of 97 strands of No. 34 A. W. G. copper is very satisfactory. The strands of the designated size are sufficiently flexible to permit proper application of the tape shield, while being large enough to facilitate soldering of the tape to the regular cable shield as well as upon itself between the various convolutions forming the wrapped shield. In addition, the designated number and size of the strands is such that the conducting capacity of the woven tape is equivalent to that of the solid copper tape regularly used for shielding purposes.

Figure 4:
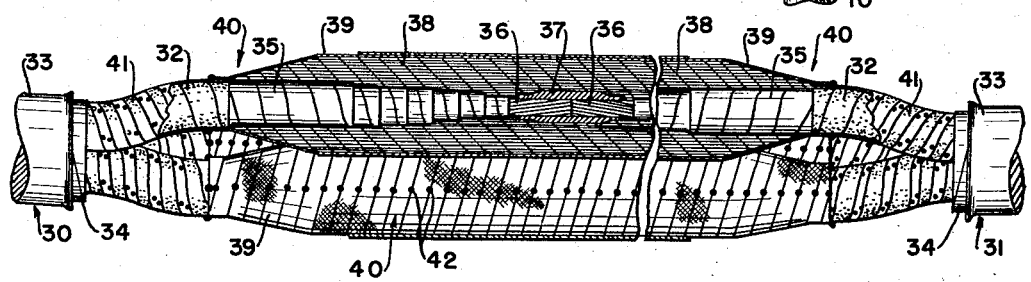
Fig. 4 is an elevation of a cable joint, with parts broken away and parts in section.

In Fig. 4 there is shown a connection jointing two three-conductor power cables 30, 31 end to end. The three insulated conductors 32 of each cable, after being exposed by stripping back the lead sheathing 33 and belt shields 34, are separated in the manner shown, and the layer 35 of insulating material surrounding each conductor is stripped back to bare a short length of conductor 36. The ends of corresponding conductors of the respective cables 30, 31 are then inserted in connectors 37 and placed in abutting relation. The conductors 36 and connectors 37 are then soldered together.

After the connection is made, each of the joined pairs of conductors is wrapped with insulating material, forming a layer 38 which is quite bulky in its center portion, while being tapered at each end to the diameter of the insulated conductors. The insulated splice is then wrapped with conductive shielding tape 39, of the type described herein, which conforms intimately to the non-cylindrical contours and the compound curves of the insulating layer 38 to form a conductive electrostatic shield 40 about the entire outer surface of the insulation. At each end, the tape 39 is soldered to the cable electrostatic shield 41, and adjacent convolutions of the tape may also be soldered together, as at 42, to provide an improved electrical path through the tape shield.

Thus, it will be apparent that the new cable shielding tape is advantageous in several respects. One of the most important advantages of the tape when used in combination with a power cable results from the substantial current-conductive capacity of the tape, which is at least equal to the regular electrostatic shield of the cable so that joints and terminal connections need not be weak or danger points in a power system. In this respect, prior woven shielding tapes of the cotton-copper type have been known to fail when overloaded by fault currents. This inevitably leads to damage of a serious nature.

Another important advantage of the new tape is that it may be readily soldered so that very good electrical connections can be made between the ends of the regular cable shield and the wrapped tape shield. This is not consistently possible with the prior cotton-copper mesh tapes, since the cotton often chars and the copper often melts under the heat of soldering so that a poor if not wholly defective connection results.

Another important advantage which is derived from the new copper mesh tape is that the tinned coating obtainable on the heavier No. 34 strands of wire is far superior to that obtainable on the thin copper ribbon used in the cotton-copper mesh tape, so that the copper material is less susceptible to corrosion.

A major use of this new tape is for the shielding of joints and terminals for shielded type rubber insulated cables and for shielded cables with non-metallic sheath regardless of the type of insulation.

Having thus described a preferred embodiment of my invention, what I claim as new, and desire to secure by Letters Patent, is:

The combination with a length of electrical power cable of the type having a conductor, a layer of insulating material about said conductor, and a current conductive electrostatic shield about the outer surface of said insulating material, said cable conductor being electrically connected at one end thereof to other conductor means and said cable conductor adjacent the connection being surrounded by a tapered layer of insulation, of an improved conductive shielding tape surrounding said tapered layer of insulation and electrically connected to the electrostatic shield, said conductive shielding tape consisting substantially entirely of strands of copper wire loosely interwoven with a simple under-over, open weave, the strands extending generally longitudinally of the tape and zig-zagging from one side to the other thereof, said tape being stretchable and compressible in transverse directions and lying in intimate contact with the outer surface of the tapered layer of insulation despite the departure thereof from cylindrical form, at least a portion of said tape being wrapped around and placed in electrical contact with said electrostatic shield whereby said tape forms a continuation of said shield.

References Cited in the file of this patent

UNITED STATES PATENTS

| | | |
|---|---|---|
| 1,780,515 | Berlin | Nov. 4, 1930 |
| 1,925,901 | Leguillon | Sept. 5, 1933 |
| 1,987,971 | Peterson | Jan. 15, 1935 |
| 2,059,825 | Talbott | Nov. 3, 1936 |
| 2,176,749 | Shanklin | Oct. 17, 1939 |
| 2,290,706 | Phillips | July 21, 1942 |
| 2,313,581 | Reed | Mar. 9, 1943 |
| 2,474,930 | Brazier et al. | July 5, 1949 |